Dec. 29, 1925.
E. O. HILLER
1,568,021
METHOD AND APPARATUS FOR HEATING GLASS FEEDERS
Filed March 14, 1925
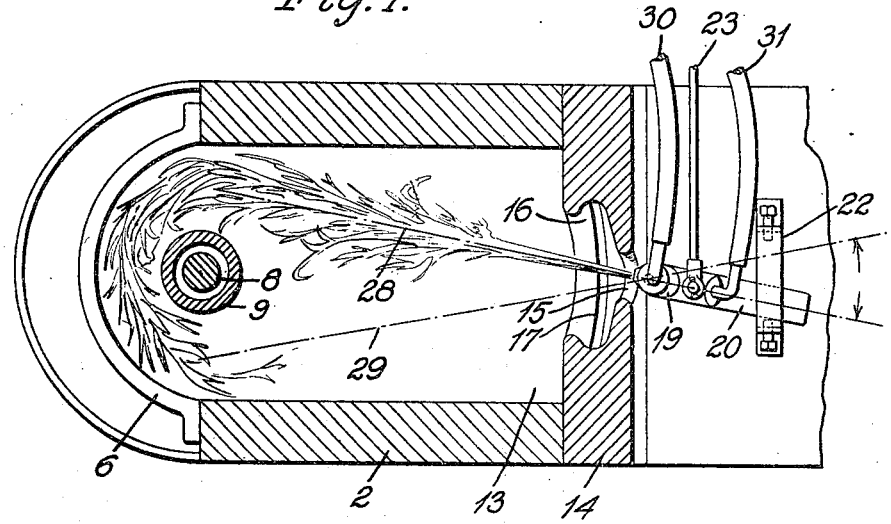
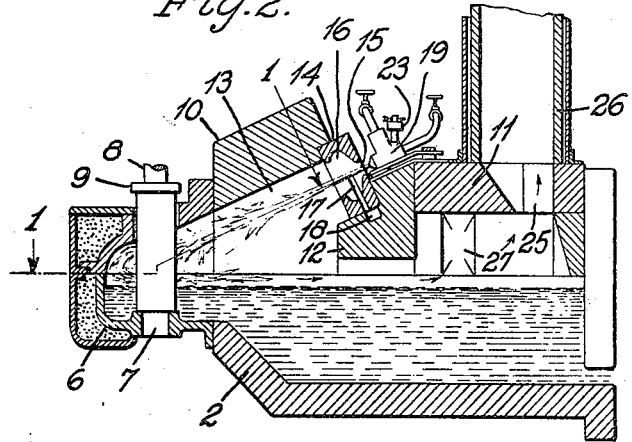
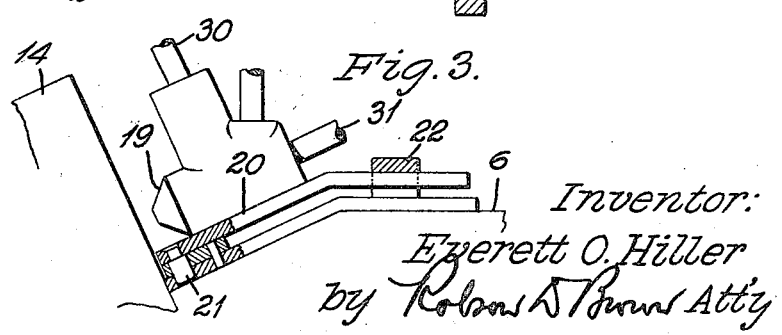
Inventor:
Everett O. Hiller Patented Dec. 29, 1925.

1,568,021

UNITED STATES PATENT OFFICE.

EVERETT O. HILLER, OF HARTFORD, CONNECTICUT, ASSIGNOR TO HARTFORD-EMPIRE COMPANY, OF HARTFORD, CONNECTICUT, A CORPORATION OF DELAWARE.

METHOD AND APPARATUS FOR HEATING GLASS FEEDERS.

Application filed March 14, 1925. Serial No. 15,511.

*To all whom it may concern:*

Be it known that I, EVERETT O. HILLER, a citizen of the United States, residing at Hartford, in the county of Hartford and State of Connecticut, have invented certain new and useful Improvements in Methods and Apparatus for Heating Glass Feeders, of which the following is a specification.

My invention relates to the art of feeding molten glass, and it has special reference to the heating of glass-feeding forehearths and other similar containers for molten glass.

One object of my invention is to provide a method and an apparatus for uniformly heating the interior of the discharge chamber of a glass feeder.

Another object of my invention is to provide a method and an apparatus whereby the temperatures in various portions of the discharge chamber of a glass feeder may be accurately controlled and may be varied with respect to one another.

A further object of my invention is to provide for the uniform heating of glass discharge chambers of the type having a rigid flow-controlling member which forms an obstruction in the discharge chamber, and which, therefore, tends to produce uneven temperature therein.

My invention contemplates the use of a burner, which is preferably mounted on the center line of the feeder, above and to the rear of the discharge chamber, and which is arranged to project its flame forwardly and downwardly into the discharge chamber. This burner is pivotally mounted and is oscillated periodically so as to direct its flame first to one side of the discharge chamber, and then to the other side. While sweeping from side to side in the discharge chamber, the flame passes across the flow-controlling member, if such an implement is employed.

One type of glass feeder which is now in extensive commercial use is composed of a conduit or forehearth, which ordinarily communicates with the interior of a melting tank furnace, and which is provided with a downwardly opening outlet for the discharge of the molten glass. A vertical impeller is mounted in the discharge chamber above the outlet, for the purpose of controlling the discharge of glass, and this impeller is surrounded by a vertically adjustable tube, which cooperates with the impeller in producing proper discharges of the glass. The forehearth and the spout are ordinarily heated from the rear or furnace side of the forehearth, and with the heating arrangements which have heretofore been employed, it has been found that the tube, or the impeller if no tube is used, tends to shade the front portion of the spout, thereby causing a cool streak in the glass. It is a principal object of my invention to avoid this streaking or "cold shadow" effect, by insuring that the flame which heats the forehearth and the spout, shall reach the extreme front portion of the discharge spout. By oscillating the burner which supplies this flame, the heating effects are caused to be uniform at the front and sides of the spout.

For a further understanding of my invention, reference may now be had to the accompanying drawing, in which:

Figure 1 is a generally horizontal sectional view taken on the line 1—1, Fig. 2, and showing a glass feeder equipped with heating means constructed in accordance with my invention;

Fig. 2 is a longitudinal vertical sectional view taken centrally through the structure shown in Fig. 1, and Fig. 3 is an enlarged side view, partly in elevation and partly in section, of the burner.

In the drawing, the numeral 2 indicates a conduit or forehearth, the interior of which communcates with a tank furnace, not shown. At the front of the forehearth 2 is a discharge chamber or spout 6, which has a downwardly opening discharge outlet 7, above which is mounted a vertically reciprocable impeller 8 enclosed within a tube 9. The usual supports for the forehearth, and the supporting and operating means for the impeller and tube are omitted from the drawing.

The forehearth 2 is covered by blocks 10, 11 and 12, the blocks 10 and 12 being so shaped and mounted as to provide a passage 13 that is inclined downwardly and forwardly toward the spout 6. At the rear of this passage is mounted a burner block 14, having a central opening 15, an enlarged mixing cavity 16, and a slot 17 communicating with an air port 18.

A burner 19 is arranged to direct its flame through the opening 15 in the burner block 14, and this burner is carried by a support 20 that is pivotally mounted at 21. A stirrup 22 spans the burner support 20, and limits its lateral movement.

For the purpose of oscillating the burner 19 upon its pivot 21, a link 23 is pivotally secured at one end to the burner 18, and is connected to any suitable mechanism for periodically reciprocating the link 23, and for thereby oscillating the burner. This reciprocating mechanism may be arranged in a variety of ways, and it is not believed necessary to show such mechanism on the drawing.

The cover block 11 is provided with an opening 25, above which is a stack 26 for leading off products of combustion from the forehearth. An air port 27 is provided for introducing cooling air into the forehearth when desired.

The angular limits of oscillating movement of the burner 19 are indicated by the lines 28 and 29 on Fig. 1. The burner is preferably arranged to remain for a time at its limt of movement, represented for example, by the line 28, and then to shift quickly to its other limit of movement, represented by the line 29. When the burner is in either of its limits of movement, its flame sweeps around the tube 9, and each oscillation of the burner shifts the direction of the flame between the tube and the front of the spout; but since these changes take place at uniform intervals, the heat condition in the front of the spout is kept uniform. The flames and combustion gases leave the spout by passing rearwardly, in contact with the surface of the glass, and the combustion gases are finally withdrawn through the stack 26.

The burner 19 is supplied with fuel and air through suitable pipes 30 and 31. The flame of the burner draws additional air through the opening 15, and a secondary supply of induced air is drawn by the flame through the slot 17.

If the burner is oscillated slowly so as to cause its flame to play for a substantial time upon the tube 9, an accumulation of heat takes place in that portion of the spout between the tube and the burner, and a corresponding reduction in temperature takes place on the opposite or forward side of the spout. This effect may be utilized when it is desired to increase the temperature of the rear portion of the spout, as compared with the temperature at the front of the spout. Similarly, the temperature at the front of the spout may be increased relatively to the temperature at the rear of the spout, by increasing the speed at which the burner is oscillated, or by lengthening the intervals between the oscillation.

I have shown and described in the accompanying drawing a structure which is well adapted for carrying out my invention, but it will be understood that various other arrangements may be employed within the scope of the appended claims.

I claim as my invention:

1. The method of heating the discharge chamber of a glass feeder, that comprises projecting a heating flame into said chamber, and causing said flame to oscillate within said chamber.

2. The method of heating the discharge chamber of a glass feeder, that comprises projecting a heating flame into the said chamber, and causing said flame to oscillate from side to side within said chamber.

3. The method of heating the discharge chamber of a glass feeder, that comprises projecting a heating flame forwardly and downwardly into said chamber, and causing said flame to oscillate from side to side within said chamber.

4. The method of heating the discharge chamber of a glass feeder, that comprises projecting a heating flame forwardly and downwardly into said chamber, and causing said flame to oscillate from side to side within said chamber about an axis disposed substantially in the longitudinal center line of said chamber.

5. The method of heating the discharge chamber of a glass feeder, that comprises projecting a heating flame forwardly and downwardly into said chamber, and periodically shifting said flame from one side to the other side of the forward portion of said chamber.

6. In heating the discharge chamber of a glass feeder having a rigid member forming an obstruction in said chamber, the method that comprises directing a heating flame into said chamber and periodically oscillating said flame past said obstructing member.

7. In heating the discharge chamber of a glass feeder having a rigid member forming an obstruction in said chamber, the method that comprises directing a heating flame forwardly into said chamber, periodically oscillating said flame from side to side past said obstructing member, and varying the relative temperatures of the parts of said chamber in front and in rear of said member, by varying the oscillation of said flame.

8. In heating the discharge chamber of a glass feeder having a rigid member forming an obstruction in said chamber, the method that comprises directing a heating flame forwardly and downwardly into said chamber, periodically oscillating said flame laterally past said obstructing member, causing combustion gases from said flame to pass rearwardly in contact with the glass in said chamber, and withdrawing said combustion gases upwardly from said chamber.

9. Apparatus for feeding molten glass, comprising a discharge chamber for the glass, and means for causing a heating flame to oscillate within said chamber.

10. Apparatus for feeding molten glass, comprising a discharge chamber for the glass having an outlet orifice, a rigid member for controlling the discharge of glass through said orifice, and means for causing a heating flame to oscillate within said chamber an to sweep across said member during its oscillations.

11. Apparatus for feeding molten glass, comprising a discharge chamber for the glass having a downwardly opening outlet orifice, a vertical rigid member for controlling the discharge of glass through said orifice, and means for causing a heating flame to oscillate laterally within said chamber and to sweep across said vertical member during its oscillations.

12. Apparatus for feeding molten glass, comprising a discharge chamber for the glass and an oscillable burner arranged to project a heating flame into said chamber.

13. Apparatus for feeding molten glass, comprising a discharge chamber for the glass having a downwardly opening outlet orifice and an oscillable burner arranged to project a heating flame forwardly and downwardly into said chamber.

14. Apparatus for feeding molten glass, comprising a discharge chamber for the glass having a downwardly opening outlet orifice, a vertical rigid member for controlling the discharge of glass through said orifice, and an oscillable burner arranged to project a heating flame into said chamber to sweep the said flame across said vertical member during the oscillations of said burner.

15. Apparatus for feeding molten glass, comprising a discharge chamber for the glass having a downwardly opening outlet orifice, a vertical rigid member in said chamber for controlling the discharge of glass through said orifice, and a burner mounted to oscillate upon a pivot aligned with said orifice and with the said member, the said burner being arranged to project a laterally oscillating heating flame into said chamber, and to sweep said flame across said member during the oscillations of said burner.

16. Apparatus for feeding molten glass, comprising a conduit or forehearth, a discharge spout at the forward end of said forehearth, means for covering said spout and the forward portion of said forehearth, and for defining a passage extending forwardly and downwardly and terminating in said spout, and a burner at the upper end of said passage, the said burner being mounted for lateral oscillation on a pivot substantially in the center line of said forehearth and said discharge spout.

17. Apparatus for feeding molten glass, comprising a conduit or forehearth, a discharge spout at the forward end of said forehearth, said spout being provided with a downwardly opening discharge outlet, a rigid vertical member in said spout for controlling the discharge of glass through said outlet, a cover for the forward portion of said forehearth and the said spout, the said cover defining a channel extending downwardly and forwardly and terminating in said spout, a burner block disposed at the upper end of said channel, a laterally oscillable burner arranged to project flame through an opening in said block, and a stack at the rear of said burner block for withdrawing products of combustion from said forehearth.

Signed at Hartford, Conn., this 10th day of March, 1925.

EVERETT O. HILLER.